United States Patent
Kajitani et al.

(10) Patent No.: US 7,117,886 B2
(45) Date of Patent: Oct. 10, 2006

(54) VACUUM REGULATING VALVE

(75) Inventors: Masao Kajitani, Ibaraki (JP); Kazuo Hiramatsu, Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 11/191,453

(22) Filed: Jul. 28, 2005

(65) Prior Publication Data

US 2006/0021656 A1   Feb. 2, 2006

(30) Foreign Application Priority Data

Aug. 2, 2004  (JP) .............................. 2004-225887

(51) Int. Cl.
G05D 16/20 (2006.01)
F16K 51/02 (2006.01)
F16K 31/122 (2006.01)

(52) U.S. Cl. .................. 137/487.5; 137/554; 251/63.5; 251/285

(58) Field of Classification Search ............. 137/487.5, 137/554; 251/62, 63.5, 284, 285
See application file for complete search history.

(56) References Cited

U.S. PATENT DOCUMENTS 6,581,635 B1 * 6/2003 Furutate et al. ............. 137/556

FOREIGN PATENT DOCUMENTS

| JP | 08-178126 | | 7/1996 |
|---|---|---|---|
| JP | 2003156171 A | * | 5/2003 |
| JP | 2005-76829 | | 3/2005 |

* cited by examiner

Primary Examiner—Ramesh Krishnamurthy
(74) Attorney, Agent, or Firm—Peter Ganjian

(57) ABSTRACT

A vacuum regulating valve has high controllability, wherein the opening of a valving member can be quickly and accurately controlled by using a small and inexpensive electric motor. In accordance with a signal indicative of a pressure set value and a pressure signal from the pressure sensor, the main controller in the valve control section outputs a signal for setting the opening of the valving member to a motor controller that controls the electric motor, and performs control to cause a pilot fluid to be supplied to a pressure receiving chamber of the piston, thereby causing the piston to move to the position of abutment with the stopper.

6 Claims, 1 Drawing Sheet

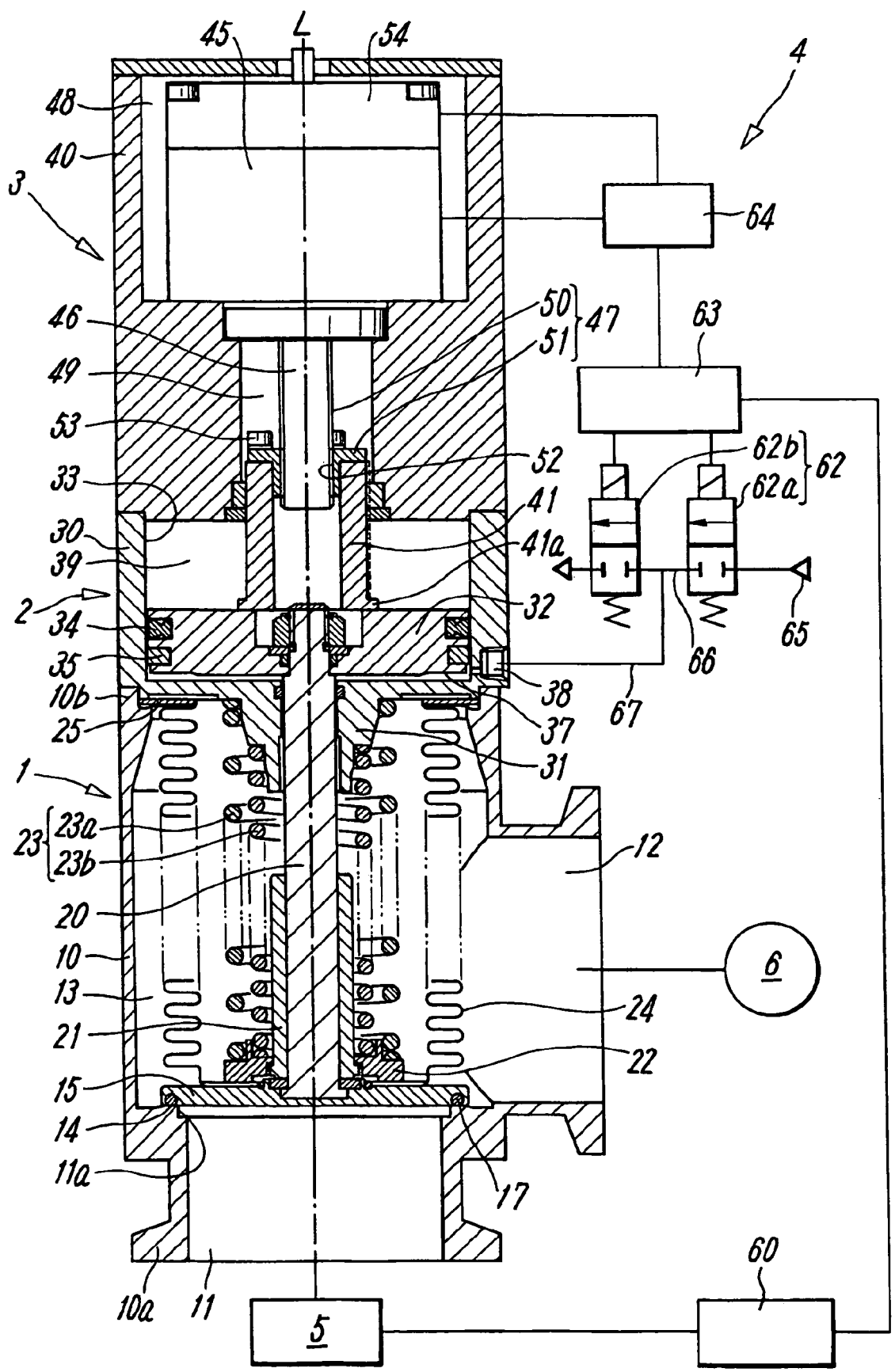

VACUUM REGULATING VALVE

BACKGROUND OF THE INVENTION

1. Field of the Invention

The present invention relates to a vacuum regulating valve for the use of, for example, creating a pressure reduction in a chemical-reaction vacuum chamber included in a physical or chemical machine or the like.

2. Description of the Related Art

In a semiconductor manufacturing system, for example, chemical processing such as etching is performed inside a vacuum chamber. In this case, a vacuum pump is used to create a pressure reduction in the vacuum pump, and a vacuum valve is used to open and close an external flowchannel connecting between the vacuum pump and the vacuum chamber. As disclosed in, for example, Patent Document 1, a vacuum valve of the aforementioned type includes two ports individually connected to a vacuum pump and a vacuum chamber, an internal flowchannel interconnecting the ports, a valve seat formed in the internal flowchannel, a valving member that opens and closes the valve seat, and a piston that drives the valving member to perform the open and close operation. The stroke of the piston as it is corresponds to the valve opening in a state where the valving member is open.

However, the vacuum in the vacuum chamber produces fluctuations depending on an increase and decrease in the amount of reaction gases, so that an amount corresponding to the fluctuations has to be compensated for to maintain the interior of the chamber at a necessary vacuum. However, such a vacuum valve is not inherently intended for regulating the vacuum pressure (negative pressure) in a vacuum chamber through the opening of such a valving member. Even if attempt was made to regulate the opening of the valving member, the opening would not be able to be quickly and accurately regulated.

In order to easily regulate the opening of a valving member of a vacuum valve of the above-described type, it is considered appropriate to form a configuration such that a stopper made accurately positionally adjustable is provided, and a piston as described above is driven to the position of abutment with the stopper (see Patent Document 2).

In this case, the positional adjustment of the stopper has to be performed quickly and accurately, so that it is advantageous to drive the stopper by using an electric motor. For the electric motor, a small and inexpensive electric motor can be used if it is used only for positional adjustment of the stopper. However, the piston is compressed thereby at high driving force against the stopper. As such, the stopper has to be supported to withstand the high driving force. In addition, it is difficult to drive the stopper under the effects of the driving force by using a small electric motor, so that countermeasures therefor have to be taken into consideration.

References (Patent Document 1) Japanese Unexamined Patent Application Publication No. 08-178126

(Patent Document 2) Japanese Patent Application No. 2003-310607

SUMMARY OF THE INVENTION

Accordingly, the present invention is to provide a highly controllable vacuum regulating valve capable of perform quick and accurate control of the opening of a valving member, thereby enabling vacuum pressure in a vacuum chamber to be quickly and accurately regulated.

In addition, the invention is to enable a stopper for setting a stop position of a piston for driving a valving member to be driven by a small and inexpensive electric motor, thereby to provide a vacuum regulating valve having high economical efficiency.

A vacuum regulating valve for achieving the above-described purposes includes a valve main body section including a valve main body section including a valving member that opens and closes a valve seat in a flowchannel between main ports; a cylinder section that performs a open and close operation of the valving member; a valve-opening regulating section that sets an opening of the valving member; and a valve control section that controls the opening of the valving member in accordance with an output of a pressure sensor that detects the pressure in a vacuum chamber. These sections are described in more detail herebelow.

The valve main body section includes a valve housing including a first and a second main port that to be connected to a vacuum chamber and a vacuum pump, a flowchannel connecting between the first and second main ports, and a valve seat provided in such a manner as to surround a peripheral portion of the first main port; a valving member that opens and closes the valve seat provided in the valve housing; a valve shaft that extends from the valving member along the direction of an axial line of the valve housing to an extent that an end of the valve shaft reaches a cylinder section; and a return spring that urges the valving member along a direction of closing the valve seat.

The cylinder section includes a piston mounted to the end of the valve shaft; a pressure receiving chamber that causes a fluid pressure in a direction of opening the valving member to act on the piston; and a pilot port that discharges a pilot fluid to the pressure receiving chamber.

The valve-opening regulating section includes a stopper that protrudes to a back surface of the piston to define a movement range of the piston; and an electric motor that performs stepless forward-backward driving of a mover provided to the stopper to an arbitrary position through a rotation-linear motion converter mechanism.

The valve control section for controlling the opening of the valving member through the piston by displacing the stopper by using the electric motor includes a rotation angle sensor, namely a rotation quantum sensor, that detects a rotation angle, namely a rotation quantum, of the electric motor; a pressure sensor that detects a pressure in the vacuum chamber; a solenoid valve that supplies and discharges the pilot fluid to the pilot port; a main controller that, in accordance with a signal indicative of a pressure set value and a pressure signal from the pressure sensor, outputs a signal indicative of a stopper position for appropriately setting the opening of the valving member to a motor controller which controls driving of the electric motor, and outputs a control signal being used to control a fluid pressure in the pressure receiving chamber to be a pressure necessary for the solenoid valve; and the motor controller that controls the electric motor in accordance with the signal indicative of the stopper position from the main controller and a signal from the rotation angle sensor.

In the vacuum regulating valve having the above-described configuration, the main controller performs a comparison between the pressure signal from the pressure sensor and the given pressure set value, thereby to output the signal indicative of the stopper position for appropriately setting the opening of the valving member to the motor controller which controls the driving of the electric motor, and outputs the control signal being used to control the fluid pressure in the pressure receiving chamber to be the pressure necessary for the solenoid valve. Thereby, the electric motor is rotated forward or backwards to move the stopper to a specified position. In addition, the pilot fluid is supplied to the pressure receiving chamber from the solenoid valve, and the piston is moved to a position where being compressed into abutment with the stopper in opposition to the resilience of the piston 32, whereby a valve opening necessary for the valving member is imparted. The valve opening can be substantially steplessly regulated in accordance with the rotation angle of the electric motor. In addition, the valving member can be opened using the resilience of the return spring in the manner that the pilot fluid in the pressure receiving chamber is discharged and thereby reduced.

In the vacuum regulating valve, the stopper is moved to be accurately positioned by using the electric motor, and the piston is compressed to abut the stopper to control the operation position of the piston. Thereby, the valving member can be quickly and accurately positioned through quick and accurate positioning of the stopper enable the opening of the valving member to be accurately controlled, so that the vacuum regulating valve has high controllability, and the vacuum pressure in the vacuum chamber can be accurately regulated. Further, since the electric motor is used only for the positioning of the stopper, a small and inexpensive electric motor can be used for the electric motor, whereby the vacuum regulating valve can be enhanced in power saving consumption and miniaturization, and is therefore made excellent in economical efficiency.

According to a practical configuration mode of the invention, the rotation-linear motion converter mechanism is configured of a ball screw that converts a rotation of an output shaft of the electric motor to a linear motion of the mover.

According to another practical configuration mode of the invention, the solenoid valve can be configured of two, first and second valves of a two-port type, wherein an input side of the first valve is connected to a pneumatic pressure source; and an output side of the second valve is open to the atmosphere, and an output side of the first valve and an input side of the first valve are connected to the pilot port. Alternately, however, the solenoid valve can be configured of a single three-port valve, wherein the three-port valve is connected to the pilot port so that compressed air from the pneumatic pressure source can be supplied and discharged to the pilot port.

According to still another practical configuration mode of the invention, in a case where a simple direction-switching valve incapable of regulating the output pressure thereof is used for the solenoid valve, the main controller is configured to include a function that, in the event of driving the electric motor, causes the pressure in the pressure receiving chamber to be released, thereby to create a reduction of a driving force being used to drive the mover through the rotation-linear motion converter mechanism with the use of the electric motor at least when driving the electric motor in a direction of reducing the valve opening of the valving member.

In a case where the solenoid valve is capable of performing the pressure control and supply of the pilot fluid that is to be supplied to the pilot port, the main controller is configured to include a function that, in the event of driving the electric motor, create a pressure reduction in the pressure receiving chamber to a controlled, predetermined pressure, thereby to create a reduction of a driving force being used to drive a mover through the rotation-linear motion converter mechanism with the use of the electric motor.

With the above-described function imparted to the main controller, the electric motor can be a very small and inexpensive motor only for positioning the stopper, whereby the vacuum regulating valve can be enhanced in power saving consumption and miniaturization, and is therefore made excellent in economical efficiency.

According to the vacuum regulating valve having the above-described configuration according to the invention, it is possible to obtain a vacuum regulating valve having high controllability wherein the opening of a valving member can be quickly and accurately controlled, whereby the vacuum pressure in the vacuum chamber can be quickly and accurately controlled. Further, driving of the stopper being used to set the stop position of a piston being used to control the valving member can be implemented by using a small and inexpensive electric motor. Consequently, the vacuum regulating valve having high economical efficiency can be obtained.

BRIEF DESCRIPTION OF THE DRAWING

The above and other objects, features, and advantages of the invention will become more apparent from the following descriptions taken in conjunction with the accompanying drawing, in which:

FIG. 1 is a cross sectional view showing an embodiment of a vacuum regulating valve according to the invention.

DESCRIPTION OF THE PREFERRED EMBODIMENT(S)

FIG. 1 is a view showing a representative preferred embodiment of a vacuum regulating valve according to the present invention. The valve is configured to include a valve main body section 1 including a valving member 15 that opens and closes a flowchannel 13 between main ports 11 and 12; a cylinder section 2 that is used for open and close operation of the valving member 15; a valve-opening regulating section 3 that sets the opening of the valving member 15; and a valve control section 4 that controls the opening of the valving member 15 in accordance with an output of a pressure sensor 60 that detects the pressure in the valving member 15. The valve main body section 1, the cylinder section 2 and the valve-opening regulating section 3 are series connected together along an axis L of the valve.

The valve main body section 1 includes a hollow valve housing 10 substantially having a round columnar or angular columnar shape. The valve housing 10 is provided with a first main port 11 that is used for connection to a vacuum chamber 5, and a second main port 12 that is used for connection to a vacuum pump 6. The first main port 11 is open in the direction of the axis L on the side of the end portion 10a of the valve housing 10, and the second main port 12 is open in the direction perpendicular to the axis L in a sidewall of the valve housing 10. In the valve housing 10, the flowchannel 13 connecting between the main ports 11 and 12 is formed, and a valve seat 14 is formed in such a manner as to surround a peripheral portion of an opening section 11a through which the first main port 11 is open toward the flowchannel 13.

The valving member 15 is a poppet type for opening and closing the valve seat 14, and is disposed coaxially with the valve seat 14 in the valve housing 10. In addition, the valve element 15 has a disco-shape, and an annular valve sealing member 17 is mounted in a position close to an outer peripheral edge of a front surface of the valving member 15. The valve sealing member 17 is formed of an elastic rubber material and is engaged with and disengaged from the valve seat 14.

A base end portion of a valve shaft 20 is fitted to a central portion of the back surface of the valving member 15. The valve shaft 20 extends along the axis L in the valve housing 10. An end portion of the valve shaft 20 extends into the cylinder section 2 and connects with a piston 32 in the manner of penetrating a partition wall 31 that partitions the valve main body section 1 and the cylinder section 2 from each other.

A spring retainer 22 is provided to the back surface of the valving member 15. A coiled return spring 23 for resiliently urging the valving member 15 along the closing direction is provided between the spring retainer 22 and the partition wall 31. The return spring 23 is configured of a large-diameter first spring 23a and a small-diameter second spring 23b. A stretchable bellows 24 is provided to the back surface of the valving member 15 in such a manner as to surround a peripheral portion of the valve shaft 20, and a sleeve 21 and the return spring 23 that are mounted on the valve shaft 20. The bellows 24 is formed of an anticorrosion material such as metal. One end of the expansible bellows 24 is attached to the back surface of the valving member 15, and the other end thereof is attached to a support plate 25 provided between an end portion of the valve housing 10 and the partition wall 31. The bellows 24 expands and contracts as the valving member 15 opens and closes. Interior spacing of the bellows 24 is exposed to the outside through an opening (not shown).

The cylinder section 2 includes a cylinder housing 30 coaxially connected to a second end portion 10b of the valve housing 10. The cylinder housing 30 has a round columnar or square columnar shape similar to the shape of the valve housing 10. The cylinder housing 30 has the partition wall 31, which partitions from the valve housing 10, on the side of one end in the direction of the axis L, and a cylinder bore 33 on the inside. In the cylinder bore 33, the piston 32 is accommodated slidably through a seal member 34 and a wear ring 35. As described above, the valve shaft 20 is slidably extended through the partition wall 31 into the cylinder bore 33, and the end portion of the valve shaft 20 is connected to the piston 32.

A pressure receiving chamber 37 is formed between the piston 32 and the partition wall 31 on the side of one surface of the piston 32. The pressure receiving chamber 37 is connected to a pilot port 38 formed to be open in a sidewall of the cylinder housing 30. The other surface of the piston 32 forms a breather chamber 39 open to the atmosphere.

As shown in FIG. 1, the valve-opening regulating section 3 includes a cover block 40, a stopper 41, and an electric motor 45. The cover block 40 is coaxially connected to an end portion of the cylinder housing 30. The stopper 41 is built into the cover block 40 and has a shape of a cylinder with an end abutting the back surface of the cylinder housing 30. The electric motor 45 performs stepless forward-backward driving of a mover 51, which is provided to the stopper 41, to an arbitrary position along the L-axis direction through a rotation-linear motion converter mechanism 47.

The electric motor 45 is a forward-reversible motor. The converter mechanism 47 converts the forward-reversal motion of the electric motor 45 to the reciprocatory linear motion, and is configured of a ball screw. The ball screw converts the rotation of an output shaft 46 of the electric motor 45 to the linear motion of the mover 51 provided to the stopper 41.

The ball screw is configured of a thread portion 50 provided to output shaft 46 of the electric motor 45 and the mover 51. The mover 51 includes an internal thread portion 52 screwed on the thread portion 50 through balls to move in the axial direction of the output shaft 46 of the electric motor 45 in a nonrotational state. A base end portion of the stopper 41 is connected through the screws 53 to the mover 51.

The cover block 40 is shaped either round columnar or square columnar, similarly as the cylinder housing 30. The electric motor 45 is mounted inside of a motor room 48 provided in the cover block 40. The converter mechanism 47 is accommodated inside of a hollow section 49 connecting between the motor room 48 and the breather chamber 39 of the cylinder section 2. An end 41a of the stopper 41 is set as a free end protruding from the hollow section 49, and is oppositely disposed in a central portion of the back surface of the piston 32.

Provided further inside of the cover block 40 is a rotation angle sensor 54 that constitutes a part of the valve control section 4 and that is formed of a rotary encoder. The rotary encoder detects the rotation angle of the output shaft 46 of the electric motor 45, and outputs a detection signal to the valve control section 4.

The valve control section 4 includes the rotation angle sensor 54, the pressure sensor 60, a solenoid valve 62, a main controller 63, and the motor controller 64. The pressure sensor 60 detects the pressure in the vacuum chamber 5. The solenoid valve 62 supplies and discharges a pilot fluid to the pilot port 38. The main controller 63 outputs a stopper position signal being used to appropriately set the opening of the solenoid valve 62 to a motor controller 64 in accordance with a pressure set value signal and a pressure signal received from the pressure sensor 60. In addition, the main controller 63 outputs to the solenoid valve 62 a control signal being used to control the fluid pressure in the pressure receiving chamber 37 to become a pressure necessary for drive control of the piston 32. The motor controller 64 controls the electric motor 45 in accordance with the stopper position signal and the signal received from the rotation angle sensor 54.

The solenoid valve 62 is configured of two, first and second valves 62a and 62b of a two-port type. The input side of the first valve 62a is connected to a pneumatic pressure source 65, and the output side of a second valve 62b is open to the atmosphere. A pipeline 66 connecting between the output side of the first valve 62a and the input side of the second valve 62b is connected to the pilot port 38 through a pipeline 67.

The first and second two-port valves 62a and 62b are each opened and closed by the control signal issued from the main controller 63. The valves 62a and 62b can be arranged to function as a single three-port direction shift valve that does not regulate the output pressure. This arrangement is possible in the manner that the flow of the pilot fluid being supplied from the pneumatic pressure source 65 to the pressure receiving chamber 37 is shut off by the first valve 62a, and the flow of the pilot fluid being discharged from the pressure receiving chamber 37 is shut off by the second valve 62b.

Thus, the single three-port valve can be used in place of the first and second two-port valves 62a and 62b. As such, the three-port valve can also be connected to permit compressed air from the pneumatic pressure source 65 to be supplied and discharged to the pilot port 38.

On the other hand, the compressed air to be supplied from the pneumatic pressure source 65 to the pressure receiving chamber 37 can be supplied at a pressure regulated to an arbitrary pressure lower than the pressure in the pneumatic pressure source. This can be accomplished in the manner that the first and second two-port valves 62a and 62b are opened and closed at a short time interval, and the open and close time is appropriately regulated in accordance with the control signal from the main controller 63.

Similarly, in the case that the single three-port valve is used in place of the first and second two-port valves 62a and 62b, the compressed from the pneumatic pressure source 65 can be supplied to the pilot port 38 at a pressure regulated. This can be accomplished in the manner that the three-port valve is added with a pressure regulating function to control the main controller 63.

In the vacuum regulating valve having the above-described configuration, when releasing the valve seat 14 to create a pressure reduction in the vacuum chamber 5, a comparison is performed in the pressure sensor 60 between a pressure signal from the pressure sensor 60 and a pressure set value supplied to the main controller 63. Resultantly, a signal indicative of a stopper position (rotation angle of the electric motor) for setting an appropriate opening of the valving member 15 is output to the motor controller 64 that controls the driving of the electric motor 45. Thereby, the electric motor 45 is rotated forward or backwards under the control by the motor controller 64, whereby the stopper 41 is moved to a specified position through the converter mechanism 47. The position of the stopper 41 is all time detected in the rotation angle sensor 54 as a rotation angle of the electric motor 45, and the detection result is fed back to the motor controller 64.

When the solenoid valve 62 is controlled by a signal from the main controller 63 and the valving member 15 is opened at an opening set by the stopper 41, the first valve 62a is opened and the second valve 62b is closed. Thereby, the pilot fluid is supplied to the pressure receiving chamber, and the piston is moved to a position where being compressed into abutment with the stopper 41 in opposition to the resilience of the piston 32. In this manner, a valve opening necessary for the valving member 15 is imparted. The valve opening can be substantially steplessly regulated in the manner that the rotation angle of the electric motor 45 is changed and the set position of the stopper 41 is thereby changed in the main controller 63 in accordance with the pressure signal from the pressure sensor 60.

In addition, the valving member 15 can be opened by using the resilience of the return spring 23 in the manner that the pilot fluid in the pressure receiving chamber 37 is discharged, and the fluid pressure in the chamber is thereby reduced through switching between the first and second two-port valves 62a and 62b.

Since the electric motor 45 is used only for the positional adjustment of the stopper 41, the electric motor 45 is preferably as small and inexpensive as possible. However, in the state that the driving force of the piston 32 is acting on the stopper 41, there is a difficulty in the positional adjustment of the stopper 41. In addition, a relatively heavy burden is imposed also on the rotation-linear motion converter mechanism 47 configured of the ball screw.

To overcome the problem, the main controller 63 can be arranged to have a function working such that in the event of driving the electric motor 45, at least when the electric motor 45 is driven in the direction of reducing the valve opening of the valving member 15, the pressure in the pressure receiving chamber 37 is released or reduced, thereby to reduce the driving force being provided to drive the mover 51 through the rotation-linear motion converter mechanism 47 with the use of the electric motor 45. The pressure in the pressure receiving chamber 37 can be released or reduced not only in the event of driving the electric motor 45 in the direction of reducing the valve opening of the valving member 15, but also in the event of driving the electric motor 45 in the reverse direction.

In addition, in the case that, as described above, the solenoid valve 62 is able to perform pressure control and to thereby supply the pilot fluid that is to be supplied to the pilot port 38, the main controller 63 can be arranged to have a function working such that in the event of driving the electric motor 45, the pressure in the pressure receiving chamber 37 is reduced to a controlled, predetermined pressure, thereby to reduce the driving force being used to drive the mover 51 through the rotation-linear motion converter mechanism 47 with the use of the electric motor 45. When not necessary, however, the pressure in the pressure receiving chamber 37 need not be released or reduced in the event of driving the electric motor 45 in the direction of increasing the valve opening of the valving member 15.

Further, in the case of pressure control of the pilot fluid, when the pilot fluid is supplied to the pressure receiving chamber 37 to compress the piston 32 against the stopper 41, the burden in the driving force of the piston 32 acting on, for example, the converter mechanism 47 which supports the stopper 41, and the electric motor 45, can be reduced by controlling the pressure being supplied to the pressure receiving chamber 37. In this case, a pressure sensor may be provided in the pressure receiving chamber 37 to detect the pressure therein, and a detected pressure can be fed back to the main controller 63.

Thus, in the vacuum regulating valve having the above-described configuration, the stopper 41 is moved to be accurately positioned by using the electric motor 45 controlled by the motor controller 64, and the piston 32 is compressed to abut the stopper 41 to control the operation position of the piston 32. Thereby, the valving member 15 can be quickly and accurately positioned through quick and accurate positioning of the stopper 41 to enable the opening of the valving member 15 to be accurately controlled, so that the vacuum regulating valve has high controllability. Further, since the electric motor 45 is used only for the positioning of the stopper 41, a small and inexpensive electric motor can be used for the electric motor 45, whereby the vacuum regulating valve can be enhanced in power saving consumption and miniaturization, and is therefore made excellent in economical efficiency.

In the above, whereas the vacuum regulating valve according to the invention has been described in detail, the invention is not limited to the embodiment described above. The present invention may be modified in various ways in design without departing from the scope and spirit described in the appended claims of the invention.

What is claimed is:

1. A vacuum regulating valve comprising:
   a valve main body section including a valve housing including a first and a second main port that to be connected to a vacuum chamber and a vacuum pump, a flowchannel connecting between the first and second main ports, and a valve seat provided in such a manner as to surround a peripheral portion of the first main port; a valving member that opens and closes the valve seat provided in the valve housing; a valve shaft that extends from the valving member along the direction of an axial line of the valve housing to an extent that an end of the valve shaft reaches a cylinder section; and a return spring that urges the valving member along a direction of closing the valve seat;

the cylinder section including a piston mounted to the end of the valve shaft; a pressure receiving chamber that causes a fluid pressure in a direction of opening the valving member to act on the piston; and a pilot port that discharges a pilot fluid to the pressure receiving chamber;

a valve-opening regulating section including a stopper that protrudes to a back surface of the piston to define a movement range of the piston; and an electric motor that performs stepless forward-backward driving of a mover provided to the stopper to an arbitrary position through a rotation-linear motion converter mechanism; and a valve control section including a rotation angle sensor that detects a rotation angle of the electric motor; a pressure sensor that detects a pressure in the vacuum chamber; a solenoid valve that supplies and discharges the pilot fluid to the pilot port; a main controller that, in accordance with a signal indicative of a pressure set value and a pressure signal from the pressure sensor, outputs a signal indicative of a stopper position for appropriately setting the opening of the valving member to a motor controller which controls driving of the electric motor, and outputs a control signal being used to control a fluid pressure in the pressure receiving chamber to be a pressure necessary for the solenoid valve; and the motor controller that controls the electric motor in accordance with the signal indicative of the stopper position from the main controller and a signal from the rotation angle sensor, wherein the opening of the valving member is controlled with the piston in a manner that the stopper is displaced by the electric motor.

2. A vacuum regulating valve according to claim 1, wherein the rotation-linear motion converter mechanism is configured of a ball screw that converts a rotation of an output shaft of the electric motor to a linear motion of the mover.

3. A vacuum regulating valve according to claim 1, wherein the solenoid valve is configured of two, first and second valves of a two-port type, wherein an input side of the first valve is connected to a pneumatic pressure source; and an output side of the second valve is open to the atmosphere, and an output side of the first valve and an input side of the first valve are connected to the pilot port.

4. A vacuum regulating valve according to claim 1, wherein the solenoid valve is configured of a single three-port valve, and the three-port valve is connected to the pilot port so that compressed air from the pneumatic pressure source can be supplied and discharged to the pilot port.

5. A vacuum regulating valve according to claim 3, wherein the main controller includes a function that, in the event of driving the electric motor, causes the pressure in the pressure receiving chamber to be discharged, thereby to create a reduction of a driving force being used to drive the mover through the rotation-linear motion converter mechanism with the use of the electric motor at least when driving the electric motor in a direction of reducing the valve opening of the valving member.

6. A vacuum regulating valve according to claim 3, wherein the main controller includes a function that, in the event of driving the electric motor, creates a pressure reduction in the pressure receiving chamber to a controlled, predetermined pressure, thereby to create a reduction of a driving force being used to drive a mover through the rotation-linear motion converter mechanism with the use of the electric motor.

* * * * *